United States Patent [19]

Peyton et al.

[11] 4,324,660
[45] Apr. 13, 1982

[54] FLUID FILTER

[75] Inventors: Richard H. Peyton, Berkley, Mass.; Donald I. Thornton, Warwick, R.I.

[73] Assignee: Fram Corporation, East Providence, R.I.

[21] Appl. No.: 180,734

[22] Filed: Aug. 25, 1980

[51] Int. Cl.³ .............................. B01D 27/08
[52] U.S. Cl. ............................ 210/440; 210/444; 210/457; 210/DIG. 17
[58] Field of Search ............ 210/130, 131, 136, 232, 210/440, 443, 444, 448, 450, DIG. 17, 168, 457

[56] References Cited

U.S. PATENT DOCUMENTS

| | | | |
|---|---|---|---|
| 1,761,915 | 6/1930 | Harwood et al. | 210/440 |
| 2,902,162 | 9/1959 | Humbert et al. | 210/438 |
| 3,061,101 | 10/1962 | Humbert | 210/130 |
| 3,204,771 | 9/1965 | Baldwin | 210/443 |
| 3,231,089 | 1/1966 | Thornton | 210/DIG. 17 |
| 3,232,437 | 2/1966 | Hultgren | 210/DIG. 17 |
| 3,260,367 | 7/1966 | Hultgren | 210/130 |
| 3,265,363 | 12/1971 | Eberle | 210/130 |
| 3,321,083 | 5/1967 | Thornton | 210/440 |
| 3,794,170 | 2/1974 | Yamaguchi | 210/DIG. 17 |
| 3,831,264 | 8/1974 | Terrell | 29/517 |
| 3,902,746 | 9/1975 | Brandt | 210/448 |
| 4,021,342 | 5/1977 | Schacht | 210/444 |
| 4,035,306 | 7/1977 | Maddocks | 210/DIG. 17 |
| 4,075,098 | 2/1978 | Paul | 210/DIG. 17 |
| 4,237,015 | 12/1980 | Fearnhead | 210/DIG. 17 |

FOREIGN PATENT DOCUMENTS

| | | | |
|---|---|---|---|
| 742050 | 9/1966 | Canada | 210/443 |
| 52-32176 | 3/1977 | Japan | 210/440 |
| 1503295 | 3/1978 | United Kingdom | 210/440 |

Primary Examiner—Ernest G. Therkorn
Attorney, Agent, or Firm—William A. Marvin; Ken C. Decker

[57] ABSTRACT

A fluid filter (10) of the spin-on automotive type has a housing with a unitary closure member (18). The unitary, or one-piece, closure member (18) includes provision for mounting of the filter and for fluid flow therethrough. Two opposed annular flanges (78, 80) of the closure member receive between them the marginal edge (72) of the filter shell in a fluid-tight crimped engagement. This arrangement facilitates manufacture of the filter by providing support to the shell wall (68) during the crimping operation and also provides an exceptionally strong joint between the shell (12) and closure member (18). Another embodiment of the filter has a closure member (18) with a marginal edge (76) having a portion of reduced thickness which facilitates its crimped engagement with the filter shell (12). Methods of making such closure members attain a unitary closure member without welding operations.

8 Claims, 4 Drawing Figures

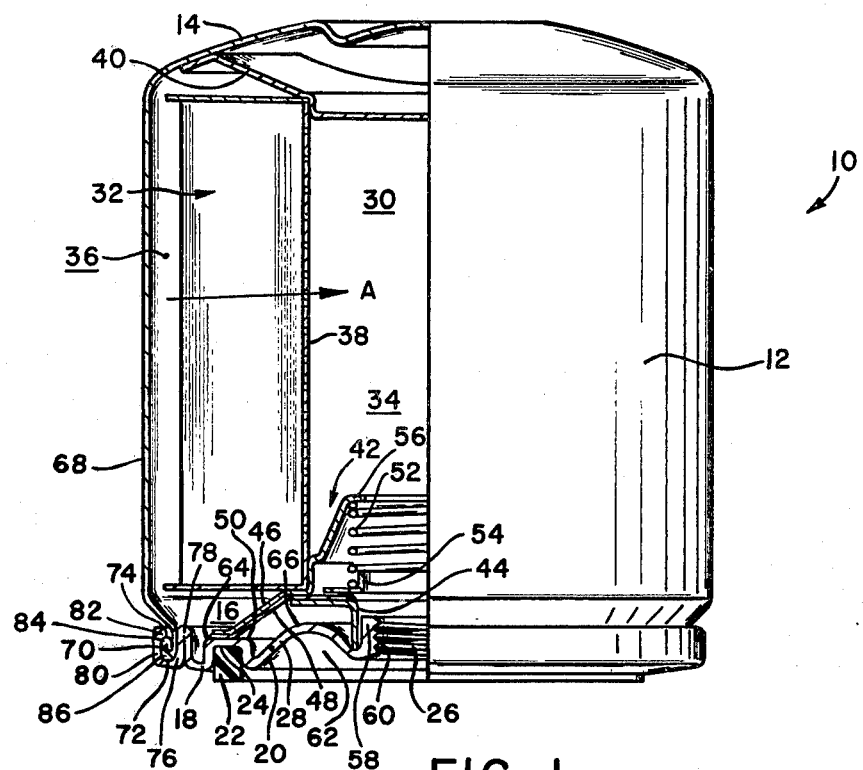

FLUID FILTER

The invention relates to an automotive oil filter. The filter includes a unitary closure member which is permanently joined in fluid-tight manner to the open end of a cup-shaped housing and which cooperates with the cup-shaped housing to form a chamber for holding filter media. The closure member includes openings for fluid flow communication to and from the filter. One of the openings is threaded and the filter is mounted by screwing it on to a threaded stem of an engine.

Filters of this type are commonly referred to as being of the spin-on type and are used generally to filter the lubricating oil of internal combustion engines, particularly automotive vehicle engines. A filter of this type is known in accordance with U.S. Pat. No. 3,231,089 to Thornton, one of the coinventors of the present invention, in which the closure member includes two components which are fastened together. One of the components includes openings for fluid flow communication to and from the filter. One of the openings is threaded for operatively mounting the filter. The other component of the closure member is relatively thin, is welded to the first component, and connects the first component to the cupshaped outer shell of the filter. The other component also carries a resilient sealing member operative upon installation of the filter to complete a closed fluid flow path through the filter.

Manufacture of filters with two-piece closure members requires the formation of the two separate closure member components and usually involves welding these components together before they are joined to the cup-shaped member. The multiplicity of forming and welding operations necessary to form such a closure member contributes substantially to the overall cost of the filter.

The invention as claimed eliminates the welding operation by providing a unitary closure member, and thereby reduces the overall cost of manufacturing the closure member. Further, the invention provides a closure member with a pair of opposed annular flanges which receive between them the marginal edge of the cup-shaped outer shell. The pair of flanges and the marginal edge of the cup-shaped member are crimped together to form a permanent, fluid-tight joint between the members. An alternative embodiment of the invention provides a closure member with a marginal edge having a thin portion which is crimped into engagement with the marginal edge of the cup-shaped member. Both embodiments provide an extremly strong joint between the members because the closure member provides support to the marginal edges during the crimping operation.

The advantages offered by the invention are mainly that the closure member is a unitary or one-piece component; no welding operation is required in its manufacture; the closure member facilitates manufacture of the filter housing because an inner annular flange supports the side wall of the cup-shaped member during the crimping operation; an exceptionally strong joint is formed between the members; and the closure member is formed from a single work piece or blank which is punched from sheet material and performs all of the functions performed by the prior two-piece construction while affording a reduced cost of manufacture.

Three ways of carrying out the invention are described in detail below with reference to drawings which illustrate only these three specific embodiments, in which:

FIG. 1 is a view, partly in cross-section, of a filter embodying our invention;

FIG. 2 is a fragmentary cross-sectional view of an alternative embodiment of our invention;

FIG. 3 is a fragmentary cross-sectional view of yet another embodiment of our invention;

FIG. 4 is an enlarged fragmentary cross-sectional view of the embodiment illustrated in FIG. 3 at an intermediate step of manufacture.

FIG. 1 shows a filter 10 which includes an outer metal shell or cup-shaped housing 12 which has a closed end 14 and an open end 16 which is closed by a closure member or cap generally indicated by the numeral 18. The outer face 20 of member 18 carries an annular seal 22 which is received in an annular recess 24 and which engages with the engine on which the filter 10 is installed to prevent fluid from leaking at the interface between the filter and the engine. The closure member 18 is provided with a threaded opening 26 which may be screwed onto a supporting stem or stud carried by the engine when the filter is installed thereon. The opening 26 also serves as an outlet port for the filter 10. Openings 28 are spaced circumferentially around the member 18 to serve as inlet ports.

Cup-shaped member 12 and closure member 18 define a chamber 30. An annular, cylindrical, pleated-paper filtering media 32 is received in chamber 30. The filter media 32 divides chamber 30 into a first compartment 34 and a second compartment 36. Filter media 32 includes a center tube 38 and is supported by an annular spring 40 which engages the closed end 14 of cup-shaped member 12 and which urges media 32 downward onto an assembly generally designated by the numeral 42, which comprises anti-drain-back and relief valves. Assembly 42 is itself supported by an annular member 44 which rests upon closure member 18. The closure member 18, the assembly 42, the annular member 44, the cup-shaped member 12 and the spring 40 cooperate to define a flow path communicating inlet ports 28 to compartment 36. The anti-drain-back valve portion of assembly 42 includes resilient fingers 46 which bias a yieldable diaphragm 48 into circumferential sealing engagement at its outer periphery with an inner surface 50 of the closure member 18 to form a pressure-responsive one-way valve. When the engine is in operation, the anti-drainback valve is forced open by engine oil pressure and oil is forced through the filtering media 32 in the direction of arrow A by the engine oil pressure so that the oil is filtered as it passes through the media 32 and is communicated to the outlet 26 via the compartment 34 defined within the center tube 38. The relief valve portion of assembly 42 includes a spring 52 and a flanged ring member 54 which together urge the yieldable diaphragm 48 into circumferential sealing engagement at its inner margin with the member 44. Member 44 includes holes (not shown) which communicate inlet port 28 with outlet 26 and which are closed by diaphragm 48. Should the filter element 32 become clogged, the engine oil pressure overcomes the bias of spring 52 on diaphragm 48 which yields to allow oil to flow from the inlets 28 to the outlet 26. An annular member 56 supports the upper end of spring 52. Member 56 is received between the filter element 32 and the diaphragm 48 and defines resilient fingers 46 at its outer periphery.

The closure member 18 is a single stamped member of substantially uniform thickness and includes an annular lip 58 which surrounds the opening 26 and in which screw threads 60 are formed. A first annular recess 62 is formed radially outwardly of opening 26 and openings 28 communicate recess 62 with compartment 36. A second annular recess 24 is formed radially outwardly of recess 62 and receives the sealing member 22. Because the closure member 18 is substantially uniform in thickness, the recesses 24 and 62 cause the closure member to define protrusions 64 and 66, respectively, which extend opposite the recesses and into the chamber 16 of the filter. A portion of protrusion 64 defines the surface 50 with which diaphragm 48 cooperates to form the anti-drain-back valve.

Cup-shaped member 12 includes a relatively thin side wall 68. In order to join the cup-shaped member and the closure member together, a bead 70 is formed in the side wall 68 at the open end of the cup-shaped member. The bead 70 defines the marginal edge 72 of the cup-shaped member and also defines a shoulder 74. The closure member 18 includes a marginal edge 76 which includes a pair of opposed annular flanges 78 and 80 projecting perpendicularly to the plane of the closure member and generally parallel to the side wall 68 of the cup-shaped member. Inner flange 78 extends into the chamber 30 of filter 10 adjacent the side wall 68 of the cup-shaped member 12. The outer annular flange 80 extends parallel to flange 78 and is spaced radially outwardly of the inner flange. The marginal edge 72 and bead 70 of the cup-shaped member are received between the flanges 78 and 80. Flange 80 terminates in a portion 82 which extends radially inwardly toward the side wall 68 of the cup-shaped member 12 so that the outer flange defines an annular cavity 84 which receives bead 70.

A permanent, fluid-tight joint is formed between the members by crimping the flanges 78 and 80 against the bead 70. Additionally, the portion 82 of outer flange 80 is crimped downward against the shoulder 74 defined by bead 70 so that the marginal edge 72 of the cup-shaped member is forced downward and tightly against a surface 86 of the closure member between the flanges 78 and 80. The flange 80 is substantially the same thickness as the remainder of the closure member 18 and is, therefore, substantially thicker than the cup-shaped member 12. Flange 78 is about twice as thick as the rest of the closure member because it is defined by a portion of the closure member which extends into the chamber 30 of the filter and is bent to fold back on itself. During the crimping operation, the flange 78, which is very strong because of its double thickness, supports the relatively thin side wall of the cup-shaped member so that a strong and fluid-tight crimped joint is formed between the members.

FIG. 2 illustrates another embodiment of our invention, which, with the exception of features to be hereinafter explained, is the same as the FIG. 1 embodiment. Thus, the same reference numerals are used throughout to designate analogous components or features. In the embodiment of FIG. 2, closure member 18 includes an opening 26 defined by a lip 58 in which screw threads 60 are formed. Lip 58 extends outwardly away from the closed end 14 of the housing 12. In order to support the filter element 32, closure member 18 defines a protrusion 66 which extends into the chamber 30 to define a shoulder which carries the lower end of the filter element 32. The closure member portion which defines protrusion 66 also defines a recess 62. Another recess 24 is defined by the closure member radially outwardly from recess 62. Recess 24 receives an annular sealing member 22. Because the closure member is of substantially uniform thickness, the portion which defines recess 24 also defines a protrusion 64 which extends into the chamber 30 of the filter housing 12. In order to retain seal 22 in recess 24, a number of tabs 90 are punched from the closure member and remain attached thereto at an edge of each tab. Each tab 90 is folded partially back and engages the seal 22 at an edge of the tab which is opposite from the tab edge attached to the closure member. Where the tabs 90 have been folded out of the closure member, the member defines openings 28 which communicate recess 62 with compartment 36. An anti-drain-back valve is defined by an annular diaphragm 48 and by an annular spring 92, both of which are carried on shoulder between the closure member 18 and the filter element 32. The spring 92 urges the diaphragm 48 into sealing engagement at its outer periphery with a surface 50 defined by protrusion 64 of the closure member. As with the embodiment illustrated in FIG. 1, the closure member 18 includes a pair of opposed annular flanges 78 and 80, which are crimped to form a permanent fluid-tight joint with the cup-shaped member.

FIGS. 3 and 4 illustrate yet another embodiment of our invention in which the same reference numerals are used to designate components or features analogous in function to those of the embodiment illustrated by FIG. 1. The closure member 18, illustrated in FIG. 3, is of generally uniform thickness and is substantially thicker than the side wall 68 of the cup-shaped member 12. Similar to the closure member of the embodiment illustrated in FIG. 1, closure member 18 carries an annular sealing member 22, defines recesses 24 and 62, and protrusions 64 and 66, and includes a lip 58 in which screw threads 60 are formed. A plurality of inlets 28 are defined by the closure member around an outlet 26. However, the marginal edge 76 of the closure member 18 includes a circumferentially extending portion 94, which is substantially the same thickness as the rest of the closure member, and a thin portion 96, which is thinner than the rest of the closure member and substantially the same thickness as the side wall 68 of the cup-shaped member 12. The marginal edge 72 of the housing 12 includes an outwardly extending flange 98. By folding the thin portion 96 of the closure member and the flange 98 of the housing tightly together and against the thick, circumferentially extending portion 94 of the closure member, a permanent, fluid-tight joint is formed between the members.

FIG. 4 illustrates the filter at an intermediate step of its manufacture and preparatory to the joining of the members. The marginal edge 72 of the closure member 18 is formed by stamping the closure member to form the circumferentially extending portion 94 having the thin portion 96 extending radially outwardly therefrom. At this step of manufacture, the flange 98 of the cup-shaped member is L-shaped in cross-section and includes a first leg 100 extending radially outwardly and terminating in a second leg 102 which extends from the first leg 100 parallel to side wall 68 and away from the closed end 14 of the housing. Those skilled in the art will recognize that the members are joined to their FIG. 3 condition by bending the second leg 102 of flange 98 around the end of the thin portion 96 of closure member 18 so that the second leg extends radially inward toward the center of the closure member. The first leg 100 of flange 98 and the thin portion 96 of closure member 18 are then bent together so that the second leg 102 of the flange 98 is crimped tightly against the thick circumferentially extending portion 94 of the marginal edge of closure member 18. As FIG. 3 illustrates, the thick portion 94 and the thin portion 96 of the marginal edge of closure member 18 define an inverted U-shape in cross-section. The second leg 102 of the flange 98 is crimped between the vertical portions of the U-shape and the first leg 100 of the flange is wrapped around the outside of the U-shape.

During the crimping operation, the thick portion 94 of the marginal edge of closure member 18 supports the thinner parts so that they may be crimped together to form a permanent, fluid-tight joint between the members.

The use of a filter according to our invention corresponds exactly to the use of prior filters of this class and no further explanation to those ordinarily skilled in the art is deemed necessary.

We claim:

1. In an automotive oil filter, a housing defining a chamber therein, said housing including a cup-shaped member having a circumferentially-extending wall defining an axis and an open end and a closure member closing said open end, an annular fluid-permeable filtering element within said housing chamber, said filtering element dividing said chamber into a pair of compartments, said closure member including a threaded opening communicating with one of said compartments, another opening in said closure member communicating with the other of said compartments, an annular seal mounted on said closure member wherein the improvement comprises:
    said open end of said cup-shaped member is defined by a circumferentially-extending marginal edge, said closure member being a stamping consisting of a single member having a circumferentially-extending marginal edge;
    the marginal edges of said cup-shaped member and of said closure member having cooperating means for forming a fluid-tight seal between the closure member and the cup-shaped member;
    said cooperating means including a bead circumscribing the marginal edge of said cup-shaped member, and an inner annular flange and an outer annular flange defined by the marginal edge of said closure member;
    said inner flange formed of a double thickness fold of said closure member projecting perpendicularly to the plane of said closure member and extending into said housing chamber;
    said outer flange formed of a single upwardly bent thickness of said closure member, located radially outward of said first flange, projecting perpendicular to the plane of said closure member and extending outside said housing chamber;
    wherein the marginal edge of said cup-shaped member is received in a channel formed between said inner and outer flanges; said outer flange includes a section projecting radially inwardly toward the wall of said cup-shaped member; and said fluid-tight seal is formed by crimping said bead between said inner and outer flanges and further crimping the bead between said inwardly projecting section and the floor of said channel.

2. The invention of claim 1 wherein said closure member further comprises:
    an annular recess for receiving said annular seal, said recess additionally defining a protrusion extending into said housing chamber.

3. The invention of claim 1 wherein the thickness of said closure member at said marginal edge is substantially greater than the thickness of the wall of said cup-shaped member.

4. The invention of claim 1 wherein at least one tab is stamped from said closure member and remains attached thereto at an edge, said tab being partially folded on said closure member and engaging said annular seal to secure the seal in said recess, and wherein said other opening in said closure member defined by the aperture in the closure member after said tab is folded therefrom.

5. The invention of claim 1 wherein the marginal edge of said closure member is substantially the same thickness as the portion of said closure member adjacent said threaded opening.

6. The invention of claim 1 or 5 wherein a portion of said closure member extends into said housing chamber and defines an annular shoulder supporting said annular filtering element.

7. In an automotive oil filter, a housing defining a chamber therein, said housing including a cup-shaped member having a circumferentially-extending wall defining an open end and a closure member closing said open end, an annular fluid-permeable filtering element within said housing chamber, said filtering element dividing said chamber into a pair of compartments, said closure member including a threaded opening communicating with one of said compartments, another opening in said closure member communicating with the other of said compartments, an annular seal mounted on said closure member characterized in that:
    said open end of said cup-shaped member is defined by a circumferentially-extending marginal edge, said closure member being a stamping consisting of a single member defining a circumferentially-extending marginal edge, the marginal edges of said cup-shaped member and of said closure member having cooperating means for effecting a fluid-tight seal between the closure member and the cup-shaped member; said cooperating means including a portion of said closure member circumscribing said closure member at the marginal edge thereof, said closure member portion being thinner than the rest of said closure member and being of substantially the same thickness as the circumferentially-extending wall of said cup-shaped member, said cooperating means further including a portion of the marginal edge of said cup-shaped member, said cup-shaped member portion being substantially the same thickness as said thin closure member portion and engaging therewith said fluid-tight seal being effected by crimping said portions together wherein the marginal edge of said closure member is U-shaped in cross-section and is defined by a thick portion of said closure member extending substantially parallel to the circumferentially-extending wall of said cup-shaped member and by a first and second parts of said thin portion thereof, said first part extending radially outward from said thick portion and perpendicularly to said circumferentially-extending wall, said closure member terminating in a second part of said thin portion extending substantially parallel to the circumferentially-extending wall of said cup-shaped member; the marginal edge of said cup-shaped member including a first radially extending portion engaging the first part of said closure member marginal edge, a second portion extending parallel to the circumferentially-extending wall of said cup-shaped member and engaging said second part of said closure member marginal edge, a third portion extending radially inward across the end of said second part, and a fourth portion extending parallel to the circumferentially-extending wall of said cup-shaped member and between the thick portion of said closure member and the second part of said thin portion thereof.

8. The invention of claim 7 wherein a portion of said closure member defines an annular recess for receiving said annular seal, said recess-defining portion of said closure member further defining a protrusion extending into said housing chamber.

* * * * *